Feb. 17, 1942.                J. E. POWELL                2,273,591
                           EGG GRADING MACHINE
                          Filed April 15, 1938
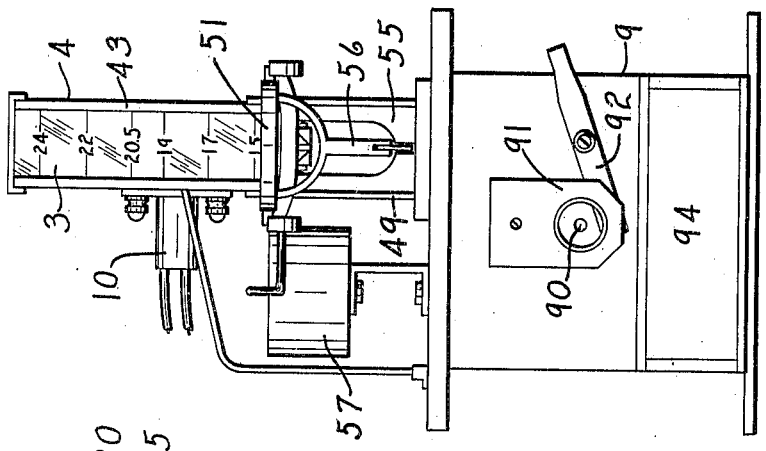
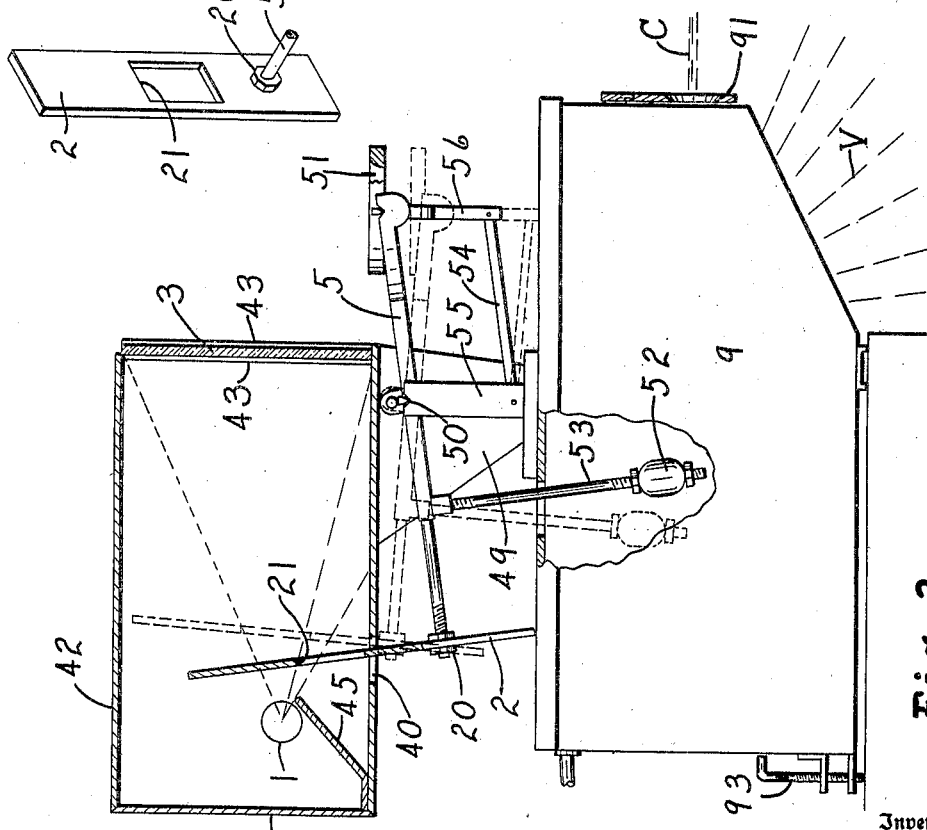
Inventor
John E. Powell
By Charles L. Reynolds
Attorney Patented Feb. 17, 1942

2,273,591

UNITED STATES PATENT OFFICE 2,273,591

EGG GRADING MACHINE

John E. Powell, Issaquah, Wash., assignor to National Poultry Equipment Co., Seattle, Wash., a corporation of Washington Application April 15, 1938, Serial No. 202,263

1 Claim. (Cl. 265—49)

The principal operations in grading an egg are (1) candling, (2) weighing, and (3) observation of the color and the condition of the shell exterior, as to dirt, etc. These operations are best effected by a single operator, with a single handling of the egg, and each requires different and hardly compatible light conditions. General but not necessarily brilliant illumination of the egg is required for the third operation, and the operator's eyes need not focus too precisely; brilliant light illuminating a scale beam or the like has heretofore been required for precision during the second operation, and here exact focusing of the eyes is necessary, though the operator's eyes may be shielded from direct light; in candling sharp focusing of the eyes is desirable, but the candling light beam is directed into the operator's eye, to be filtered through the egg itself.

The candling must of necessity be performed in a darkened room, and the operator's eyes are dilated from the darkness. To require such eyes to focus sharply, by brilliant reflected light, to read a scale beam accurately, thousands of times a day, and within the same second to observe the interior of the egg by transmitted light, and to observe the exterior condition and color of the shell by general illumination, is to subject those eyes to severe strains. The rapid transitions from candling darkness to weighing illumination produce the most severe strains, for the color and exterior conditions can be observed by subdued light, shielded from the observer's eyes, and without requiring sharper focusing than is required for candling. It is therefore extremely desirable to enable the weighing operation to be accomplished accurately and rapidly without requiring the use of brilliant light, and without requiring an abrupt nor appreciable change of eye focus from that used in candling.

To do this the weighing operation must be accomplished in a darkened room, and without material change in the nature of the illumination therein. The weighing must be extremely accurate, for the different grades vary by only a couple of ounces in the dozen, which means that individual eggs which vary only a small fraction of an ounce—perhaps one-sixth of an ounce—must be assigned accurately to different grades. The requirement for accuracy has generally been met only at the expense of performing the weighing operation separately from the candling operation, which is wasteful of time and therefore costly, or at the expense of brilliantly illuminating a scale beam or its equivalent, within a darkened room, to the discomfort of the operator and with actual physical harm to his or her eyes, with consequent general economic loss, and usually with a slowing down of the work due to fatigue, again causing the grading operations to cost more than they would under more favorable conditions.

It has appeared, then, that the grading operation as a whole must be subject either to the delay and expense of twice handling the eggs, once for candling and once for weighing and exterior grading, or to the inaccuracy of attempting to determine weight without a visual scale indication, or to the slow and trying method wherein all three grading operations are performed at one handling, but wherein the brilliant illumination during weighing was the chief disturbing and delay-inducing factor. By this invention, however, it is possible to perform all three operations—and in particular to perform both candling and weighing operations—without change of eye focus, without noticeable change of light conditions as they affect the candler's eyes, within a darkened room as is required by the unchangeable conditions of candling, and yet to perform them with extreme accuracy. This, then, is the general object of this invention, and, as an associated object, to so improve conditions of egg-grading that the candler is less fatigued, can do more rapid and better work, and hence that the operations of grading cost less on the whole.

It is one of the objects of my invention to provide a grading machine which incorporates both a candling device and a weighing device, and in which the indicator of the weighing device employs a beam of light as an indicator, and it is a subsidiary object to provide a grading machine of this type in which the light employed for indicating the weight of the egg gives an indication which is unmistakable, even in the darkened room, and by light means which are directed towards the eyes of the grader, yet which is so arranged that it does not harmfully affect the grader's eyes, and is completely extinguished during the candling operation, so that there may be no distraction whatsoever to proper determination of the condition of the interior of the egg while it is being candled.

It is also an object of my invention to provide an egg weighing device, and preferably one embodying a balance beam, in which all indications are accomplished through the instrumentality of a weightless and frictionless beam of light shadow, whereby there is no possibility of error due to the employment of physical contacts and the like, and whereby the scale gradations may be widely spaced for accuracy and easy reading of the small differences without any inertia of moving parts.

It is a further object to provide in such a weighing device a scale which may be marked as the user may desire, in accordance with local grading requirements, which may vary in different localities, and which may be differently marked from time to time as such requirements may change, or as the user may prefer.

It is a further object to provide such a grading machine which in its entirety is simple, rugged, compact, reliable, and well arranged to facilitate the several operations to be performed with it, and enabling their performance with the least fatigue to the grader.

To these ends my invention comprises the novel grading machine, and the novel parts thereof and their relative arrangement to each other, as shown in the accompanying drawing, described in this specification, and as will be more particularly pointed out by the claim which terminates the same.

In the accompanying drawing I have shown my invention in a form which at present is preferred by me, it being understood that various changes may be made in the form, character, and relative arrangement of the parts without departing from the scope of my invention as hereinafter defined.

Figure 1 is a front elevation of the machine, as viewed from the grader's station.

Figure 2 is a side elevation of the machine, with the upper cabinet and other parts shown in vertical section.

Figure 3 is a perspective view of the opaque plate which forms an important part of the weighing machine.

The particular construction of the candling device, apart from its position and relationship to the weighing device, of itself forms no part of this invention. A candling light (not shown) is disposed within a cabinet 9, having a candling aperture 90, which projects intense light rays forwardly towards the grader's station, as indicated at C. An egg-positioning plate 91 may be located surrounding the aperture for ready location of an egg in candling position. A gate 92 may be pivotally supported at the front of the cabinet adjacent the candling aperture 90, movable into position to cut off the emission of light rays from the candling aperture at will. For the accommodation of the weighing device of the scale beam type, means are provided for leveling the cabinet 9, which serves as a support for the weighing device, such means being indicated in the leveling screw 93. The lower front portion of the cabinet may be left open to form a large aperture, closed by a glass 94, whereby soft light may be emitted, as shown by the rays V, downwardly directed out of the eyes of the grader, but so that he may view the eggs upon which he is working, in the performance of the grading by external appearance.

The weighing device may take various forms, and in the broad aspect of my invention its particular structure is immaterial. As herein shown it comprises a scale beam 5, pivotally mounted at 50 between its ends, having a scale pan 51 to support an egg, and a depending weight 52 on the end of an arm or post 53. The position of the post 53 and of the weight 52 thereon are adjustable to accomplish accurate balancing. The scale pan is preferably held upright by a parallel link 54, extending between the standard 55, mounted on the top of the cabinet 9, and a depending post 56 which is integral with the scale pan 51. With the scale beam in proper balance, its end opposite the scale pan will swing upwardly a distance which is regulated by the weight of the egg. Oscillations may be damped by a suitable dashpot 57 having a plunger which is operatively connected to the scale beam, in a known manner.

The weight 52 and its immediately associated parts do not comprise the entire counterbalance for the beam. In addition the beam is provided with a plate 2, which is mounted upon its end, and preferably adjustable therealong by the nuts 20, and this plate, of opaque material, is provided with an edge 21, which is one of the indicating elements of the scale. With parts at rest the scale beam may be held in a position of rest by contact of the lower edge of the plate 2 against the top of the cabinet 9.

The upper end of the plate, being that portion which includes the edge 21, projects through an aperture 40 within a closed cabinet 4, which is suitably supported, as by brackets 49, on the upper side of the cabinet 9. A light source, such as a small electric lamp 1, is suitably supported within the cabinet 4, the socket 10 being illustrated in Figure 1 for this purpose. This lamp 1 is disposed at one side of the plate 2, preferably on the opposite side thereof from the grader's station, and the upright side of the cabinet, which is toward the grader's station, is left open, and is closed by a translucent screen 3 of ground glass, for instance. This screen is preferably held removably in place, as for instance between channel-forming flanges 43. The cabinet 4 preferably is provided with a removable top cover 42.

The three cooperating elements 1, 2 and 3, and more particularly the edge 21 of the element 2, are so positioned relative to each other that in the position of rest shown in full lines in Figure 2, light from the source 1, shining past the edge 21, will miss falling upon the screen 3, and the screen will be completely in shadow. However, at the opposite extreme position of the weighing means and edge 21 the light which passes the edge 21 from the light source 1 will pass through the opening in the casing closed by the screen 3, and this screen will be fully illuminated by light from the source 1. In any intermediate position of the opaque element 2 and the edge 21 the rays of light propagated from source 1 in the direction of the screen 3 and passing the edge 21 will impinge upon the screen and brightly illuminate a portion of it. Thus it is apparent that as the position of the edge 21 of the opaque element is varied in relation to the rays of light directed towards the screen, a proportional illumination of the screen will be effected; that is, the screen will appear to the eyes of the observer to be divided into two portions, (a) a brightly illuminated portion, and (b) a dark or shadowy portion. The parts are arranged and organized in such fashion that the shadow line or boundary between the brightly illuminated portion of the screen 3 and the shadowy or dark portion will by its position, which is governed by the movement of the scale beam 5 under the influence of the weight of an egg being weighed upon its pan 51, indicate precisely the weight of the egg, the screen 3 having been previously marked in accordance with test weights to indicate the weight corresponding to any given position of the shadow line. Since the shadow boundary must be sharply defined, the light source should approach a geometrical point, or at least a geometrical line which is parallel to the edge 21; in commercial lamps wherein the light source is a short coil of small diameter, the length of this coil should be parallel to the edge 21, to reduce to the minimum the spread of its rays transversely of this edge.

In Figure 1 the screen is shown as marked with the various limiting and average weights of several different grades of eggs. Thus if an egg weighs in excess of 19 ounces to the dozen, it is in an intermediate grade, and if it weighs more than 22 ounces to the dozen it is in the top grade. These grade or weight indications may be permanently printed upon the screen 3, or may be placed thereon by the user of the machine, the ground glass affording a field for such marks as it is desired to place thereon, and such marks may be erased and changed from time to time as the desires and needs of the user require. The screen may be readily removed from its guide 43 to permit such changing of the marking, or to replace a broken or defective screen.

The plate 2 with its index edge 21 has been described as movable relative to two cooperating fixed elements, the light 1 and the screen 3. It will be apparent that any one of the three cooperating elements may be movable, by movement of the weighing device under the influence of the weight of an egg being weighed, and any other two may be fixed; also, it will be apparent that the indication can be given by relative movement of two such elements relative to each other, and of both relative to the third. I do not desire to be restricted only to movement of the plate and its edge, as described, or otherwise than is required by the claim.

It is practically essential that no light be permitted to shine from the cabinet 4, during candling, especially, as any such light would reflect into the eyes of the grader, and would disturb the acuteness of his perception, and would cause a strain upon his eyes. Because of the arcuate movement of the connection between the edge 21 and the scale beam 5 the aperture 40 must be somewhat larger than required merely to pass the thin plate 2, in the simple construction shown, and to prevent light shining through this aperture 40 I provide a light baffle 45 in the cabinet 4 which is interposed between the light source 1 and the aperture 40, and which prevents any light passing out through the aperture.

The grader, picking up his eggs by the light of the rays V, disposes an egg in front of the candling aperture 90 and views its interior by the light of the rays C, the gate 92 being swung aside at such time. He may swing the gate 92 across the aperture 90, and lift the egg and place it upon the pan 51. The scale beam tilts to a degree which corresponds to the weight of the egg, and its oscillation is prevented by the dash-pot 57. The shadow boundary thrown by the edge 21 moves upwardly along the screen 3, and when it comes to rest, indicates precisely on the scale provided on the screen the weight of the egg, though there are no moving parts and no contacting parts which by friction or contact might disturb the accuracy of the reading. The light which is thrown upon the screen 3 is not so brilliant that it harmfully affects the eyes of the grader, though it is directed towards the grader's eyes, and though there is no light round about, this light and shadow indicates at once to the grader the weight of the egg, for the figures designating the weight are illuminated, and he places it in the proper container for eggs of this weight and grade. He is not required to view a pointer movable over a scale and illuminated by an external light source, nor is he required to determine, by looking perpendicularly to the face of a scale, curved or otherwise, where the index pointer is pointing. He may view the scale from any angle and it always gives the same indication, and is accurate, or can be made accurate by proper marking of the screen, without question.

The screen 3 has been described as marked in figures and by lines to indicate the different grades. As a complemental or as a substitute way of indicating different grades, the several sections of the screen may be differently colored. The lowermost section, to the grade line "19" may be, for example, red; the next section, to the grade line "22" may be green; and the top section uncolored, or yellow. This shows at a glance, even without reading the figures, in what grade any given egg will fall.

What I claim as my invention is:

An egg weighing scale, for use in a dark room, comprising a cabinet having an open upright side, a ground glass screen or the like closing such side, a scale beam pivotally mounted externally of the cabinet, a light source within the cabinet, an opaque plate mounted upon the scale beam and projecting, at right angles thereto, into the cabinet, the cabinet being suitably apertured for passage and movement of the plate, said plate, within the cabinet, being disposed between the light source and the screen, and having an edge past which light shines to define a shadow boundary movable along the screen to indicate the position of the scale beam, and a baffle fixed between the light source and the plate-receiving aperture, in position to prevent emission of light therethrough.

JOHN E. POWELL.